(No Model.) 2 Sheets—Sheet 2.
J. C. FELL.
APPARATUS FOR CONCENTRATION OF MINERALS BY MEANS OF COMPRESSED AIR.
No. 550,911. Patented Dec. 3, 1895.
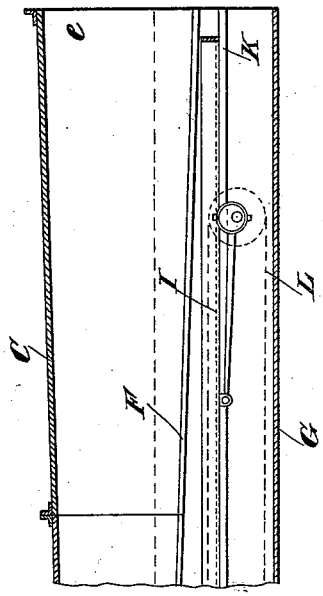
FIG. 4.
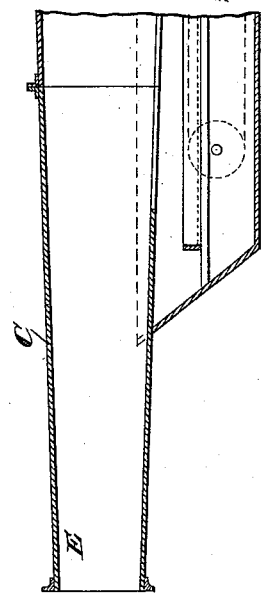
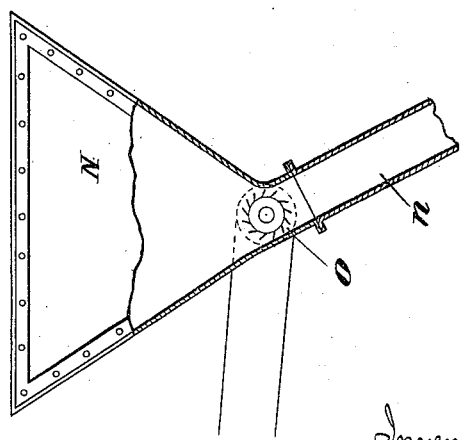
FIG. 5.

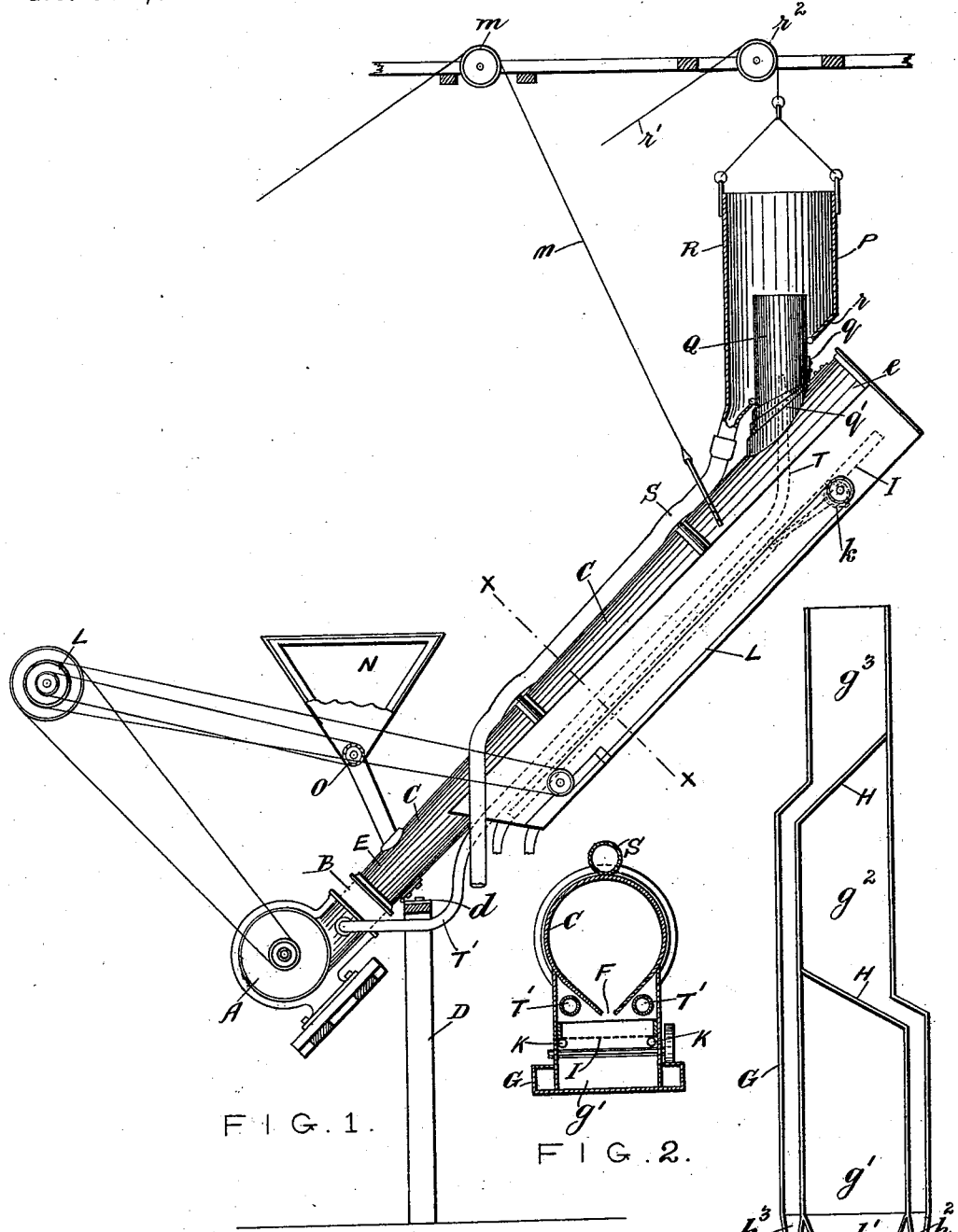

UNITED STATES PATENT OFFICE.

JOHN C. FELL, OF LONDON, ENGLAND, ASSIGNOR TO ALFREDO OVALLE VICUÑA, OF VALPARAISO, CHILE.

APPARATUS FOR CONCENTRATION OF MINERALS BY MEANS OF COMPRESSED AIR.

SPECIFICATION forming part of Letters Patent No. 550,911, dated December 3, 1895.

Application filed April 16, 1895. Serial No. 545,866. (No model.)

*To all whom it may concern:*

Be it known that I, JOHN CORRY FELL, residing at London, England, have invented Improvements in Apparatus for the Concentration of Minerals by Means of Compressed Air, of which the following is a specification.

This invention relates to apparatus for the concentration of minerals, and has for its object the provision of means whereby this result is effected in a simple and expeditious manner through the medium of compressed air.

My invention consists in the combination of a concentrating device consisting of a conical tube adjustable as to inclination, having a longitudinal slot arranged from end to end, an air-forcing device connected to the smaller end of the conical tube, and a uniform feeding device for delivering a uniform amount of ground or crushed material containing the mineral to the smaller end of the conical tube.

The principle upon which my machine works is the action of gravity upon the particles of various specific gravities and relative volumes of which the material to be treated is composed, having had momentum imparted to them by a current of air, so as to locate their position of deposit according to their respective grades, the force of the wind-blast, the length of travel, and retardation of gravity being capable of easy adjustment by my improved apparatus.

In order that my invention may be the better understood, I will now proceed to describe the same in relation to the accompanying drawings hereunto annexed, reference being had to the letters marked thereon.

Like letters refer to like parts in the various figures.

Figure 1 is a side elevation of my apparatus, a portion being shown in section. Fig. 2 is a transverse section of the main tube on the line $x\,x$ in Fig. 1. Fig. 3 is a plan of the sorting-receptacle under the main tube. Figs. 4 and 5 are enlarged detail views.

To carry my invention into effect, I arrange a fan or air-forcing appliance A upon a suitable support, and I connect to this fan A by a flexible connection B, such as canvas hose, a conical tube C, which is mounted upon a support D, preferably by a hinge $d$, so that its angle with the horizontal line may be altered as desired. The conical tube C has its smaller end E connected to the fan A, while its larger end $e$ projects upward in a slanting direction. The lower side of this tube C has a slot F arranged along the greater part of its length. (Shown in Fig. 2.) Below the slot F is a box or receptacle G, which is attached to the tube C and serves to receive the concentrated mineral after it has passed through the slot F. This box is divided in its length into compartments $g'$, $g^2$, and $g^3$ by division-plates H, and the compartments are provided with exit-passages $h'$, $h^2$, and $h^3$, respectively. Within the receptacle G, I arrange the sieve I, which is adapted to slide longitudinally upon supports K, a reciprocatory movement being produced by the eccentric $k$, operated by the mechanism L, driven from any convenient source of power. The tube C is supported at its upper end by a rope M, passing over a pulley $m$, or by any other equivalent device, so that its angle can be adjusted, as desired, according to the class of material being treated or the result desired. At the lower end of the tube C a hopper N is arranged, having a uniform feeding device N, through which the crushed material is fed to the tube C through the pipe $n$. This feeding device may consist of a ribbed or toothed barrel $o$ in the exit-orifice of the hopper, adapted to revolve by means of the mechanism L. At the upper end of the tube C, I arrange a secondary concentrating device P, which consists of a tube Q, attached to the tube C by a hinge $q$, and telescopic shield or flexible attachment $q'$, so that whatever the angularity of the tube C may be the tube Q always stands vertical. Around this tube Q I arrange a second tube R of larger diameter and greater height, so that an annular space is left between the two tubes Q and R. The tube R has a slanting bottom $r$, which makes a sliding joint with the tube Q. The tube R is suspended by a rope $r'$, passing over a pulley $r^2$ or other equivalent device, so that the height of the top edge of the tube R above the top edge of the tube Q may be adjusted at will, and that the tube R may always remain vertical and concentric with the tube Q. At the extreme lower end of the tube R an exit-orifice with pipe S is provided, and within the tube Q, I arrange one or more blowpipe-nozzles T, which are attached to the pipes T' T', led up within the receptacle G and connected to the supply of compressed air.

This apparatus may be operated with or without the secondary concentrating-tubes Q and R. I will first describe its operation without the said tubes.

The fan A is started, which forces a current of air up the tube C. The material which is crushed is fed at a uniform rate from the hopper N by the feeding device O into the tube C and, meeting the current of air, is thereby set in motion in an upward angular direction. Now, as the tube C is conical in form, it follows that the velocity of the air as it proceeds up the tube C must be decreased proportionately as the area is increased, and consequently its effect upon the material becomes less and less as the material travels up the tube, with the result that the mineral and material of high specific gravity first drop from the current of air out of the tube C, through the slot F, into the first division $g'$ of the receptacle G, and the pieces of less specific gravity are carried up higher until they in turn fall out of the current and are deposited in the receptacle G according to their grade, the light material being carried out at the end $e$ of the tube C into the surrounding atmosphere. It is of course necessary to adjust the angle of the tube C in relation to a horizontal line and also the pressure of the air according to the material being treated and the degree of concentration required. If with the residue that is blown out at the end $e$ of the tube C any valuable ore is included, the end of the tube is lifted by its lifting-gear M $m$, thus altering its angle, which is equivalent to lengthening it, the material then offering greater resistance to upward motion to the current of air, which tends to force it in an upward direction.

The second method of working consists in concentrating simultaneously in the tube C and the tubes Q and R. To do this, the end $e$ of the tube C is closed with canvas or in any other equivalent manner, and the air and material after passing up the tube C pass up through the tube Q. The diameter of this tube Q is slightly larger than the lower end E of the tube C. The coarser and heavier constituents of the material are separated by the tube C, as hereinbefore described. The column of air laden with the lighter particles of the material then rises in a vertical column through the tube Q, and when it emerges from the top end of the tube Q into the tube R of larger diameter the air-pressure suddenly drops and the particles gradually become retarded in their passage upward, and as they cannot fall back again through the tube Q they take a sideward direction out of the current and fall into the annular space between the tubes Q and R and slide down the slanting bottom $r$ into the tube S. The residue of light particles in the air column are of course delivered upward into the surrounding atmosphere. If, however, any valuable constituents are being thrown out with the residue, the tube R is raised by means of its lifting-gear $r'$ $r^2$ until such a position has been obtained, when the whole of the valuable constituents are delivered down the annular space between the tubes Q and R. This second method of concentration is recommended when working gold ores or when the grindings are very fine. In order to increase the action of the air in the tubes Q and R, when found necessary, I use one or more of the blowpipe-nozzles T', fed with air from the fan A, to produce an inductive effect on the column of air. A shutter or other device is fitted to each tube T' to regulate the passage of air therethrough.

Referring now to the sieve I, which is fitted with different kinds of wire-cloth graduated in mesh according as to which compartment of the receptacle G it is situated over, the object of the sieve I is to concentrate the ore by volume after having been concentrated by density in the tube C. As a matter of fact, the crushing and grinding are never altogether uniform. Grains more or less equal in weight, but of different sizes, are delivered to each section, the largest particles being of stone or iron, which on account of their hardness remain larger than the rest of the material during grinding. The sieve I therefore prevents the passage of these larger grains into the receptacle over which they have dropped, but which by its angular disposition and jigging motion shakes the grains down until they reach a mesh large enough to allow them to pass into the proper compartment of the receptacle G. Naturally the ore obtained in the second and third sections is less pure than that of the first section, as usually happens in other concentrating-machines, but I have found that my machine much improves the grade.

It is obvious that the ores of the second and third sections can be further purified up to the grade of the first section by passing them through another similar machine properly adjusted both in inclination and air-pressure to produce the desired result.

Having now described my invention, what I claim, and desire to secure by Letters Patent, is—

1. A machine for concentrating minerals consisting in the combination of an air forcing appliance, a conical tube having a longitudinal slot arranged from end to end, and connected at its smaller end to the air forcing appliance, means for adjustment of the angle of inclination of the said tube, a feeding device adapted to deliver a uniform quantity of crushed material to the smaller end of the conical tube, and a receptacle divided in its length into compartments arranged below the said slot of the conical tube to receive the concentrated mineral in various grades, substantially as described.

2. In a machine for concentrating minerals the combination of an air forcing appliance, a conical tube having a longitudinal slot arranged from end to end, and connected at its lower end to the air forcing appliance, means for the adjustment of the angle of inclination of the said tube, a feeding device adapted to deliver a uniform quantity of crushed material to the smaller end of the conical tube, and a receptacle divided in its length into compartments arranged below the said slot of the conical tube with a sieve fitted with sections of varying mesh, disposed in an angular position between the said slot of the conical tube and the said divided receptacle, and means for jigging the sieve to classify the material as to size, substantially as described.

3. In a machine for concentrating minerals, the combination of an air forcing appliance, a conical tube having a longitudinal slot arranged from end to end, and connected at its lower end to the air forcing appliance, means for the adjustment of the angle of inclination of the said tube, a feeding device adapted to deliver a uniform quantity of crushed material to the smaller end of the conical tube, and a receptacle divided in its length into compartments arranged below the said slot of the conical tube, with a vertically arranged tube adjustably attached to the exit of the said conical tube, a second tube of larger diameter and greater height, arranged concentrically about the said vertical tube and adapted to slide telescopically thereon, leaving an annular space between the said two tubes, ending with an inclined bottom and exit orifice, and means for the adjustment of the two tubes relatively to one another, substantially as described.

4. In a machine for the concentration of minerals the combination of an air forcing appliance, a conical slotted tube connected thereto at its smaller end, and a vertically arranged tube attached to the exit of the said conical tube, a second tube of larger diameter and greater height, arranged concentrically about the said vertical tube and adapted to slide telescopically thereon leaving an annular space between the said two tubes ending with an inclined bottom and exit orifice, means for the adjustment of the two tubes relatively to one another, with one or more blow pipe nozzles within the inner tubes and means for their connection with the air forcing appliance, substantially as described.

In testimony whereof I have signed my name to this specification in the presence of two subscribing witnesses.

JOHN C. FELL.

Witnesses:
RICHARD A. HOFFMANN,
CHARLES H. CARTER.